（12） United States Patent
Araki

(10) Patent No.: US 10,703,147 B2
(45) Date of Patent: Jul. 7, 2020

(54) TIRE OPERATION SERVICE SYSTEM AND METHOD

(71) Applicant: The Yokohama Rubber Co., LTD., Minato-ku, Tokyo (JP)

(72) Inventor: Yasuhiko Araki, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 159 days.

(21) Appl. No.: 16/073,325

(22) PCT Filed: Dec. 20, 2016

(86) PCT No.: PCT/JP2016/087952
§ 371 (c)(1),
(2) Date: Jul. 26, 2018

(87) PCT Pub. No.: WO2017/130609
PCT Pub. Date: Aug. 3, 2017

(65) Prior Publication Data
US 2019/0030967 A1    Jan. 31, 2019

(30) Foreign Application Priority Data

Jan. 28, 2016  (JP) .................................. 2016-014408

(51) Int. Cl.
*B60C 23/20* (2006.01)
*B60C 19/00* (2006.01)
(Continued)

(52) U.S. Cl.
CPC .............. *B60C 23/20* (2013.01); *B60C 19/00* (2013.01); *B60C 23/00* (2013.01);
(Continued)

(58) Field of Classification Search
None
See application file for complete search history.

(56) References Cited

U.S. PATENT DOCUMENTS 7,032,441 B2 *  4/2006  Kanatani ............. B60C 23/0416
                                                          73/146
8,497,771 B2 *  7/2013  Lickfelt .............. B60C 23/0418
                                                          340/442
(Continued)

FOREIGN PATENT DOCUMENTS

JP    2003-308404    10/2003
JP    2003-331075    11/2003
(Continued)

OTHER PUBLICATIONS

International Search Report for International Application No. PCT/JP2016/087952 dated Jan. 24, 2017, 4 pages, Japan.

*Primary Examiner* — Natalie Huls
*Assistant Examiner* — Jermaine L Jenkins
(74) *Attorney, Agent, or Firm* — Thorpe North & Western

(57) ABSTRACT

A tire operation service system includes a tire information monitoring device to monitor information on a tire and detect position information and unique identifying information, a tire operation server including a user information database stored with user information corresponding to the identifying information and a shop information database stored with position information on each shop and connected to the tire information monitoring device via a communication network, and a shop terminal and a user terminal connected to the tire operation server via a communication network, wherein the tire operation server includes a user information extraction unit, a nearby shop extraction unit, a shop-with-handling-ability extraction unit, and a shop information transmission unit.

12 Claims, 3 Drawing Sheets

(51) Int. Cl.

| | | |
|---|---|---|
| *B60C 23/00* | (2006.01) | |
| *G06Q 50/30* | (2012.01) | |
| *G06Q 30/06* | (2012.01) | |
| *B60C 23/04* | (2006.01) | |
| *G06Q 10/00* | (2012.01) | |
| *G06Q 50/10* | (2012.01) | |

(52) U.S. Cl.
CPC ...... *B60C 23/0435* (2013.01); *B60C 23/0479* (2013.01); *G06Q 10/20* (2013.01); *G06Q 30/0611* (2013.01); *G06Q 50/30* (2013.01); *B60C 2019/004* (2013.01); *B60C 2019/006* (2013.01); *G06Q 50/10* (2013.01)

(56) References Cited

U.S. PATENT DOCUMENTS

| | | | |
|---|---|---|---|
| 2007/0069877 A1* | 3/2007 | Fogelstrom | B60C 23/005 340/442 |
| 2012/0001745 A1* | 1/2012 | Li | B60C 23/0408 340/445 |
| 2015/0005982 A1* | 1/2015 | Muthukumar | B60T 1/10 701/1 |
| 2017/0225526 A1* | 8/2017 | Tomakidi | G07C 5/008 |

FOREIGN PATENT DOCUMENTS

| | | |
|---|---|---|
| JP | 2005-045501 | 2/2005 |
| JP | 2005-067499 | 3/2005 |
| JP | 2015-125719 | 7/2015 |

\* cited by examiner

TIRE OPERATION SERVICE SYSTEM AND METHOD

TECHNICAL FIELD

The present technology relates to tire operation service system and method, by which a rescue service such as tire replacement is provided to a user when there is a tire failure.

BACKGROUND ART

In general, when a failure such as blowout and air pressure reduction occurs in a pneumatic tire mounted on a vehicle, it is necessary to quickly handle the failure. Thus, it is necessary to quickly search for a shop capable of handling the failure around the place where the failure has occurred. In this regard, for example, Japanese Unexamined Patent Publication No. 2003-308404 discloses that, when contact of a failure is received from a user, the nearest shop having a tire coinciding with user information registered in advance (vehicle information, tire information and the like) is specified from position information of the user at the time of the occurrence of the failure and the user information, the position information of the user and the tire information are transmitted to the nearest shop, shop information on the nearest shop is presented to the user, so that it is possible to quickly handle the failure.

However, in this method, since the nearest shop is specified on the basis of the shop information recorded in advance (tire information and the like stored in each shop), it is not possible to confirm that a tire coinciding with the user information exists in the nearest shop at the time of the occurrence of the failure, resulting in the failure being unable to be handled. Additionally, quick failure handling may be unavailable due to the traffic situation of the nearest shop, resulting in a problem that the user is inconvenienced.

SUMMARY

The present technology provides tire operation service system and method, by which a rescue service such as tire replacement is efficiently provided to a user when there is a tire failure.

A tire operation service system of an embodiment of the present technology includes: a tire information monitoring device installed in a vehicle, including a function of monitoring information on a tire mounted on the vehicle and a function of detecting position information, and including unique identifying information;

a tire operation server including a user information database stored with user information corresponding to the identifying information and a shop information database stored with position information on each shop and connected to the tire information monitoring device via a communication network; and a shop terminal and a user terminal connected to the tire operation server via a communication network, wherein the tire operation server includes:

a user information extraction unit that, on the basis of identifying information transmitted from the tire information monitoring device together with tire abnormality information, extracts user information corresponding to the identifying information from the user information database;

a nearby shop extraction unit that, on the basis of position information transmitted from the tire information monitoring device together with the tire abnormality information and the user information extracted by the user information extraction unit, extracts nearby shops matching the position information and the user information from the shop information database;

a shop-with-handling-ability extraction unit that extracts a handling-ability shop, in which failure handling is possible, from the nearby shops on the basis of information on possibility of failure handling transmitted from a shop terminal of the nearby shops; and a shop information transmission unit that transmits shop information on the handling-ability shop to the user terminal.

In order to achieve the aforementioned object, a tire operation service method of an embodiment of the present technology uses a tire information monitoring device installed in a vehicle, including a function of monitoring information on a tire mounted on the vehicle and a function of detecting position information, and including unique identifying information, a tire operation server including a user information database stored with user information corresponding to the identifying information and a shop information database stored with position information on each shop and connected to the tire information monitoring device via a communication network, and a shop terminal and a user terminal connected to the tire operation server via a communication network; the method comprising:

the tire operation server performing:

a user information extraction step of, on the basis of identifying information transmitted from the tire information monitoring device together with tire abnormality information, extracting user information corresponding to the identifying information from the user information database;

a nearby shop extraction step of, on the basis of position information transmitted from the tire information monitoring device together with the tire abnormality information and the user information extracted by the user information extraction unit, extracting nearby shops matching the position information and the user information from the shop information database;

a shop-with-handling-ability extraction step of extracting a handling-ability shop, in which failure handling is possible, from the nearby shops on the basis of information on possibility of failure handling transmitted from a shop terminal of the nearby shops; and a shop information transmission step of transmitting shop information on the handling-ability shop to the user terminal.

The tire operation service system and method of the present technology are configured as described above. Therefore, at the time point at which the abnormality of a tire is detected by the tire information monitoring device, since tire abnormality information is directly transmitted from the tire information monitoring device to the tire operation server, it is possible to find the tire abnormality (the failure of the tire) in the early stages. Additionally, when handing the tire abnormality (the failure of the tire), nearby shops, which handle the tire mounted on a vehicle of a user and exist near the failure occurrence place, can be specified by the nearby shop extraction unit (in the nearby shop extraction step) on the basis of the position information transmitted from the tire information monitoring device and the user information extracted by the user information extraction unit. In this case, since the nearby shops are not only simply specified, but also a handling-ability shop, which can perform failure handling at the time of the occurrence of the failure, can be specified by the shop-with-handling-ability extraction unit (in the shop-with-handling-ability extraction step) among the nearby shops, so that it is possible to present the user with a shop which exists around the tire abnormality occurrence place and can reliably perform failure handling. In this case, since the function of detecting the position information is incorporated in the tire information monitoring device, it is not necessary to separately provide a device for detecting the position information, and since the user information is correlated with the unique identifying information given to the tire information monitoring device, it is possible to quickly extract the user information by simply receiving various types of information from the tire information monitoring device.

In the tire operation service system of the present technology, the tire operation server can include a shop confirmation unit that transmits at least a part of the user information extracted by the user information extraction unit to the shop terminal of the nearby shops extracted by the nearby shop extraction unit and confirms the possibility of the failure handling, and the shop-with-handling-ability extraction unit can include a function of extracting the handling-ability shop, in which failure handling is possible, from the nearby shops on the basis of the information on possibility of failure handling, which is transmitted from the shop terminal of the nearby shops, according to the at least a part of the user information transmitted by the shop confirmation unit. In this configuration, by the shop confirmation unit, it is possible to reliably know the possibility of the failure handling in the nearby shops when there is a failure. Additionally, at least a part of the user information is transmitted from the shop confirmation unit to the nearby shops including the handling-ability shop, so that the handling-ability shop (the nearby shop) at the time of the failure handling can actually perform work preparation for the failure handling until a user reaches, resulting in a reduction of time required for the failure handling.

In the tire operation service system of the present technology, the user terminal can include a display unit that displays shop information on a plurality of handling-ability shops, which is transmitted by the shop information transmission unit, as a selection linked with a contact unit for each handling-ability shop. In this configuration, a user can contact a shop, from which the failure handling is actually received, (can request the failure handling and the like) before reaching it. This is advantageous in that quick failure handling can be received. Additionally, the contact to the handling-ability shop is performed by an operation for selecting the shop information displayed on the user terminal as a selection, so that it is possible to simplify work of the user side regarding the contact to the shop.

In the tire operation service system of the present technology, shop information on a registration shop registered in advance by a user can be stored in the user information database, the tire operation server can include a determination unit, which determines possibility of reaching the registration shop on the basis of tire abnormality information and position information transmitted from the tire information monitoring device and a registration shop confirmation unit which transmits at least a part of the user information to a shop terminal of the registration shop and confirms possibility of failure handling, and the shop information transmission unit can include a function of transmitting the shop information on the registration shop to the user terminal when the determination unit determines that reaching the registration shop is possible and the registration shop confirmation unit confirms that failure handling in the registration shop is possible, and a function of transmitting the shop information on the handling-ability shop to the user terminal when the determination unit determines that reaching the registration shop is not possible or the registration shop confirmation unit confirms that failure handling in the registration shop is not possible. In this configuration, it is possible to determine the possibility of the failure handling in the registration shop registered in advance by the user, and when the failure handling in the registration shop is possible, it is possible to preferentially present the registration shop.

In the tire operation service method of the present technology, the tire operation server can perform a shop confirmation step of transmitting at least a part of the user information extracted by the user information extraction unit to the shop terminal of the nearby shops extracted by the nearby shop extraction unit and confirming possibility of failure handling, and the shop-with-handling-ability extraction unit can extract the handling-ability shop, in which failure handling is possible, from the nearby shops on the basis of the information on possibility of failure handling, which is transmitted from the shop terminal of the nearby shops, according to at least a part of the user information transmitted by the shop confirmation unit. In this configuration, in the shop confirmation step, it is possible to reliably know the possibility of the failure handling in the nearby shops when there is a failure. Additionally, in the shop confirmation step, at least a part of the user information is transmitted to the nearby shops including the handling-ability shop, so that the handling-ability shop (the nearby shop) at the time of the failure handling can actually perform work preparation for the failure handling before a user reaches it, resulting in a reduction of time required for the failure handling.

In the tire operation service method of the present technology, the user terminal can display shop information on a plurality of handling-ability shops, which is transmitted by the shop information transmission unit, as a selection linked with a contact unit for each handling-ability shop. In this configuration, a user can contact a shop, from which the failure handling is actually received, (can request the failure handling and the like) before reaching it. This is advantageous in that quick failure handling can be received. Additionally, the contact to the handling-ability shop is performed by an operation for selecting the shop information displayed on the user terminal as a selection, so that it is possible to simplify work of the user side regarding the contact to the shop.

In the tire operation service method of the present technology, shop information on a registration shop registered in advance by a user can be stored in the user information database, and the tire operation server can perform a determination step of determining possibility of reaching the registration shop on the basis of tire abnormality information and position information transmitted from the tire information monitoring device and a registration shop confirmation step of transmitting at least a part of the user information to a shop terminal of the registration shop and confirming possibility of failure handling, and the shop information transmission unit can transmit the shop information on the registration shop to the user terminal when the determination unit determines that reaching the registration shop is possible and the registration shop confirmation unit confirms that failure handling in the registration shop is possible, and transmits shop information on the handling-ability s hop to the user terminal when the determination unit determines that reaching the registration shop is not possible or the registration shop confirmation unit confirms that failure handling in the registration shop is not possible. In this configuration, it is possible to determine the possibility of the failure handling in the registration shop registered in advance by the user, and when the failure handling in the registration shop is possible, it is possible to preferentially present the registration shop.

DETAILED DESCRIPTION

Hereinafter, the configuration of the present technology is described in detail below with reference to the accompanying drawings.

Figure 1:
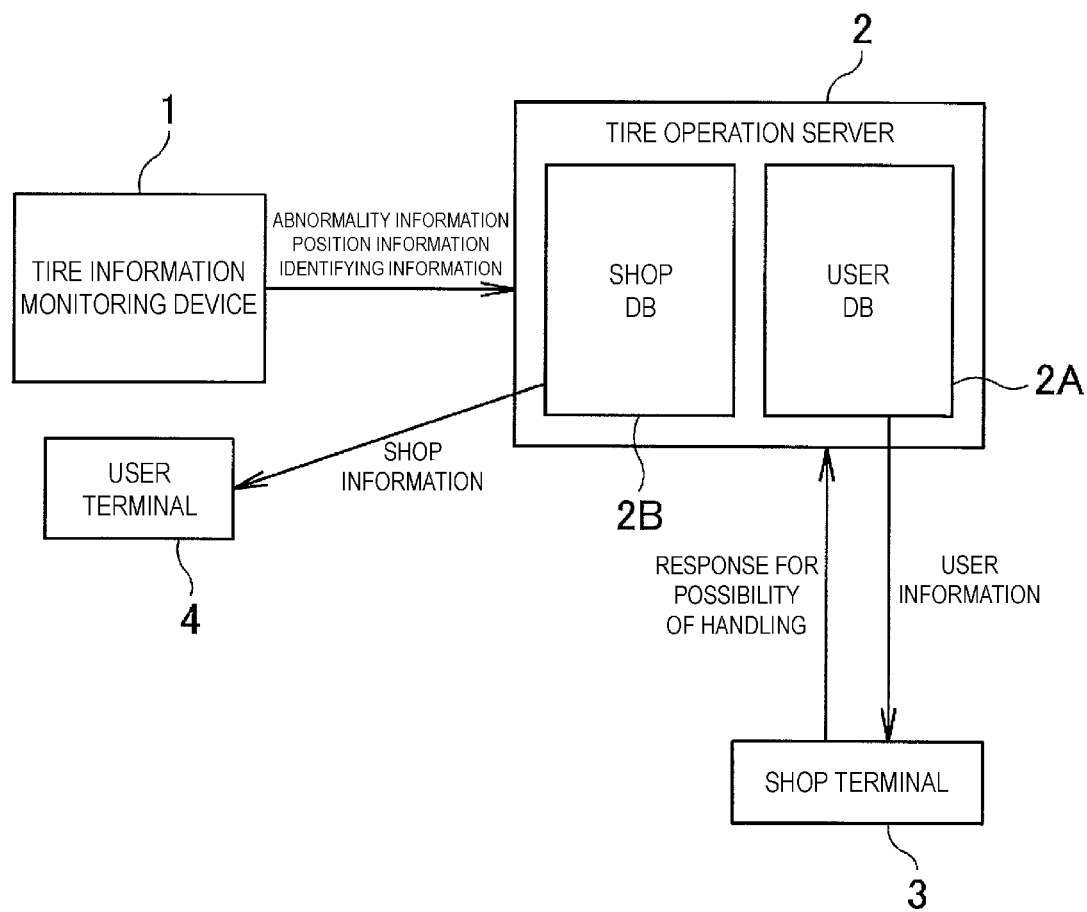
FIG. 1 is an explanation diagram illustrating an overview of a tire operation service system according to an embodiment of the present technology.

As illustrated in FIG. 1, a tire operation service system of the present technology includes a tire information monitoring device 1, a tire operation server 2, a shop terminal 3, and a user terminal 4. These are connected to one another via a communication network including the Internet, an intranet, a communication network, a telephone line and the like.

The tire information monitoring device 1 is a device that mainly monitors tire information on air pressure, temperature, abrasion, acceleration, unique identifying information and the like of a tire, and includes a sensor installed in the tire to measure the tire information (air pressure, temperature, abrasion, acceleration, unique identifying information and the like), and a transmitting device installed in the tire to transmit the tire information measured by the sensor to an exterior (the tire operation server to be described below in the present technology) of the tire. In the present technology, particularly, the transmitting device transmits tire abnormality information (tire information indicating a sign of a tire failure, tire information on the cause of the tire failure, and the like) on a sudden drop of air pressure, a sudden increase of temperature, and the like. An example of such a device is the so-called TPMS (Tire Pressure Monitoring System). In a general TPMS, a terminal installed in a vehicle is configured to receive the tire information transmitted from the transmitting device and display the tire information such that a user can find the aforementioned tire abnormality information, and an alarm is configured to be displayed on the terminal installed in the vehicle when the aforementioned tire abnormality information is detected. Note that since such a transmitting device of the general TPMS basically transmits the tire information (the tire abnormality information) to the terminal installed in the vehicle, the transmission of the tire abnormality information to the tire operation server in the present technology may be performed using a separate transmitting unit (a transmitting device) connected to the aforementioned communication network.

The tire information monitoring device 1 of the present technology has a function of detecting position information as well as a function of monitoring the aforementioned tire information, and has unique identifying information given thereto. The function of detecting the position information, for example, can be given by providing a GPS. Additionally, the unique identifying information can be given by incorporating a storage medium, such as a memory stored with identifying information such as an ID allocated to each tire information monitoring device 1, in the tire information monitoring device 1. The position information and the identifying information are transmitted to the tire operation server to be described below together with the aforementioned tire abnormality information by using the aforementioned transmitting device or by the aforementioned separate transmitting unit.

The tire operation server 2 serving as an entity of the tire operation service system of the present technology includes a user information database 2A and a shop information database 2B, which will be described below, and has a user information extraction unit, a nearby shop extraction unit, a shop-with-handling-ability extraction unit, and a shop information transmission unit. Additionally, the tire operation server 2 optionally has a shop confirmation unit to be described below. Specifically, the tire operation server 2 includes a computer including a control unit composed of a CPU (central processing unit) and the like, a ROM (read only memory), a RAM (random access memory), a hard disk, a monitor, a keyboard and the like. The user information database 2A and the shop information database 2B included in the tire operation server 2 are stored in a storage unit such as a ROM and a hard disk, and the user information extraction unit, the nearby shop extraction unit, the shop confirmation unit, the shop-with-handling-ability extraction unit, and the shop information transmission unit are configured to function when the control unit controls each element on the basis of a computer program stored in the aforementioned storage unit.

The user information database 2A is a database that stores information (user information) on a plurality of users on a user basis. Particularly, in the present technology, the user information is stored in correlation with the identifying information given to the tire information monitoring device 1 installed in a vehicle owned by a user. The user information, for example, includes a user name, tire information (for example, a user, a tire size, a tire pattern, a mounting time, a failure history, a retread history, a traveling distance, an inspection history and result, a rotation history, a purchase price and time, a storage history and the like) on a tire mounted on the vehicle owned by the user, vehicle information (for example, a maker, year and model, a shape, a designated tire size and number of tires, a driving type, a registered number, a traveling distance, a storage place and the like), tire shop information used, and the like. Note that optional information can also be added to each user and be stored in the user information. For example, when the vehicle owned by the user is a special vehicle and a shop capable of performing failure handling is limited, information on the shop can also be stored as a registered shop in advance.

The shop information database 2B is a database that stores, for each shop, information (shop information) on a shop such as whether it is an auto-repair shop or tire store capable of performing failure handling with respect to a vehicle in which there is a tire failure. It is sufficient if at least position information is stored as the shop information; however, a telephone number, a URL (uniform resource locator), an address, a facility (for example, an acceptable vehicle (a lift and the like), the number of simultaneously workable shops, and the like), a business hour, a handled tire (for example, for a truck and a bus, for a passenger car, a construction vehicle, for a cultivation vehicle, and the like), price information and the like may also be optionally stored.

On the basis of the identifying information transmitted from the tire information monitoring device 1 together with the tire abnormality information, the user information extraction unit extracts user information corresponding to the identifying information from the user information database 2A. By using the user information extraction unit, it is possible to specify a user who needs failure handling such as tire replacement due to abnormality (a failure) occurring in a tire. At this time point, user information (tire information and the like), which is required in the failure handling, is also specified.

On the basis of the position information transmitted from the tire information monitoring device 1 together with the tire abnormality information and the user information extracted from the user information database 2A, the nearby shop extraction unit extracts nearby shops corresponding to the position information from the shop information database 2B. By using the nearby shop extraction unit, it is possible to select shops, which are positioned near a place where a failure has occurred and that can handle the tire registered in the user information, from a plurality of shops recorded in the shop information database in advance. The nearby shop extraction unit may extract only the nearest one shop or a plurality of shops.

The shop confirmation unit, for example, transmits at least a part of the user information to the shop terminal 3 which is installed in the nearby shop and will be described below, and confirms the possibility of failure handling. That is, when the nearby shops are extracted on the basis of only the shop information stored in advance, the shops may not have a tire at the time point at which a failure has occurred (a tire matching the user information may not exist) or quick failure handling may be unavailable due to the traffic situation of the shops. However, by using the shop confirmation unit, it is possible to confirm whether the possibility of realtime failure handling in the nearby shops when there is a failure. An example of a part of the user information transmitted by the shop confirmation unit includes information on a tire, which is mounted on a vehicle owned by a user, and the like. The shop confirmation unit specifically includes a unit that transmits an inquiry mail and the like for confirming the possibility of the failure handling to the shop terminal 3, a unit that displays the mail on a dedicated screen provided to the shop terminal 3, a unit that transmits the mail to fax machines of the nearby shops, etc. In this case, since a part of the user information is transmitted to the shop side, the shop can prepare failure handling on the basis of the user information until the user reaches.

The shop-with-handling-ability extraction unit extracts a handling-ability shop, which can perform failure handling, from the nearby shops on the basis of the information on the possibility of the failure handling transmitted from the shop terminal 3. As described above, since the possibility of the failure handling is confirmed by the shop confirmation unit and the information on the possibility of the failure handling obtained as a result of the confirmation is realtime information when there is a failure, the handling-ability shop is extracted on the basis of the information, so that it is possible to extract a shop from which a user can receive failure handling reliably and quickly.

When the tire operation server 2 does not include the aforementioned shop confirmation unit, for example, information (information on tire inventory or traffic situation of a shop, and the like) required for confirming the possibility of the failure handling is allowed to be transmitted from the shop terminal 3 to a tire management server at a predetermined interval and is allowed to be stored in the shop information database 2B as a part (information on the possibility of failure handling frequently updated) of the shop information, so that it is possible to extract a handling-ability shop by the shop-with-handling-ability extraction unit. In this case, the interval (the update interval of the information on the possibility of the failure handling), at which the information on the possibility of the failure handling is transmitted from the shop terminal 3, is properly set, so that it is possible to suppress a time lag between an update time of the information on the possibility of the failure handling and a time at which a failure has occurred and thus a user can receive the failure handling sufficiently, reliably, and quickly.

The shop information transmission unit transmits shop information on the handling-ability shop to the user terminal 4 to be described below. In this way, it is possible to allow a user to know an address and the like of the handling-ability shop.

The shop terminal 3 is a terminal which is installed in a shop registered in the shop information database 2B and exchanges data and the like between the tire operation server 2 and the shop as described above. In addition to the use of the dedicated terminal of the present system, it is also possible to use a communication device and the like owned by a shop (a cellular phone, a smart phone, a tablet terminal, a PC (personal computer), a fax machine and the like) having the aforementioned transmission/reception function.

The user terminal 4 is a terminal which is held by a user registered in the user information database 2A and exchanges data and the like between the tire operation server 2 and the user as described above. In addition to the use of the dedicated terminal of the present system, it is also possible to use a TPMS terminal (a terminal and the like that display tire information or alarm information) or a communication device and the like owned by a user (a cellular phone, a smart phone, a tablet terminal, a PC, a fax machine and the like) having the aforementioned transmission/reception function. Additionally, the user terminal 4 may be incorporated in an instrument panel of a vehicle. A user holding the user terminal 4 is not always a driver that steers a vehicle, and may be in an office of a company to which the driver belongs, a maintenance factory, and the like. In this case, data transmitted from the tire operation server 2 is transmitted to the user terminal 4 (an office and the like) and then is transferred to the driver by an intra-office communication network and the like of a company and the like to which the user belongs.

As the user terminal 4, the aforementioned various terminals can be used; however, it is preferable to have a display unit that displays the shop information on a plurality of handling-ability shops, which is transmitted by the shop information transmission unit, as a selection linked with a contact unit for each handling-ability shop. Examples of such a display unit include an input unit, such as a touch panel and a touch screen, which enables an operation of a device (the user terminal 4) by pressing display on a screen. Alternatively, it is also possible to use a combination of a monitor (a monitor of a dedicated terminal, a monitor of a PC, a monitor incorporated in an instrument panel, and the like), which displays the selection, and a physical key (a button of the dedicated terminal, a keyboard of the PC, a button incorporated in the instrument panel, and the like) corresponding to the selection. In this way, a user can select a shop, from which failure handling is received, by an intuitive and simple operation (by directly operating the shop information di splayed on the screen of the user terminal 4 or operating the physical key corresponding to the selection displayed on the monitor of the user terminal 4, and the like). Furthermore, a user can contact a shop, from which the failure handling is actually received, (can request the failure handling and the like) before reaching it. This is advantageous in that quick failure handling can be received.

Figure 2:
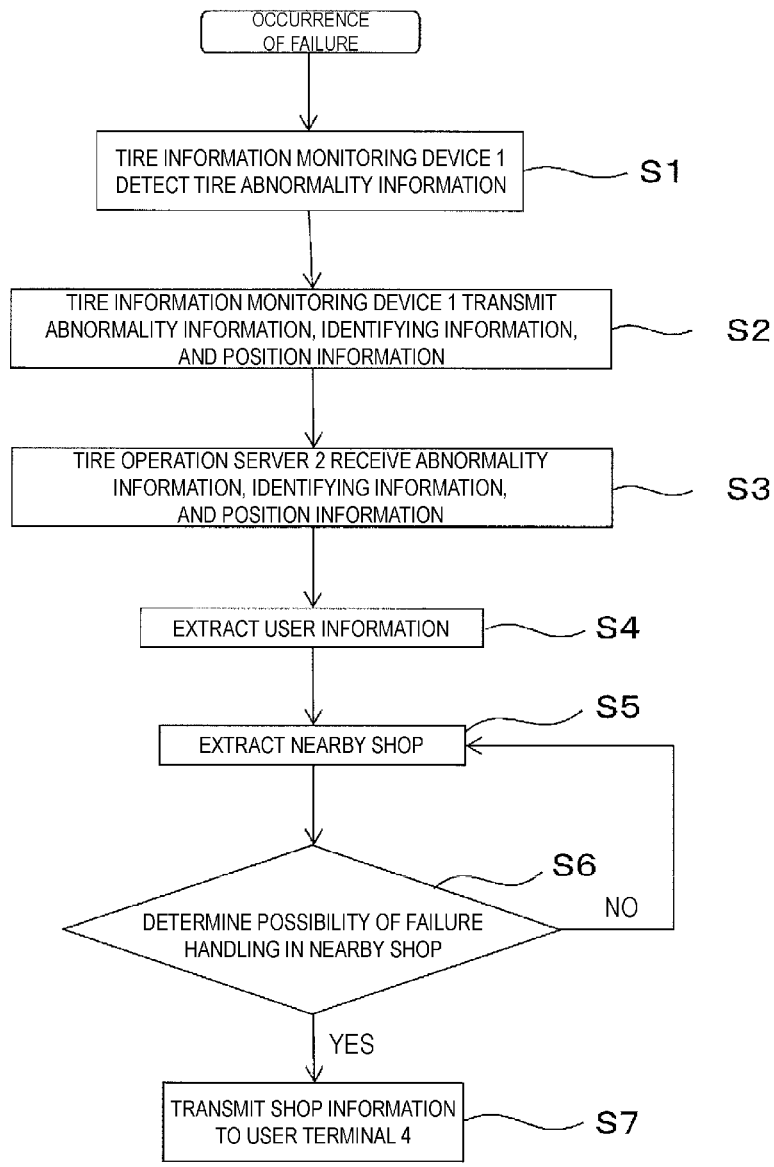
FIG. 2 is a chart for explaining the flow of a tire operation service method according to an embodiment of the present technology.

The tire operation service system configured as described above is operated as illustrated in FIG. 2. That is, when there is a failure, the tire information monitoring device 1 detects tire abnormality information of a sudden drop of air pressure, a sudden increase of temperature, and the like (S1). The detected abnormality information is transmitted from the tire information monitoring device 1 to the tire operation server 2 together with identifying information and position information (S2). When these types of information are received (S3), the tire operation server 2 extracts user information corresponding to the identifying information from the user information database 2A on the basis of the identifying information (a user information extraction step: S4).

Next, on the basis of the position information and the user information, nearby shops matching the position information and the user information are extracted from the shop information database 2B by the nearby shop extraction unit (a nearby shop extraction step: S5). The extracted nearby shops are shops which are positioned near a failure occurrence place specified from the position information and handle a tire (a tire mounted on a vehicle of a user) specified on the basis of the user information.

Then, in the extracted nearby shops, the possibility of failure handling is determined, and a handling-ability shop, which can perform the failure handling, is extracted from the nearby shops, by the shop-with-handling-ability extraction unit (a shop-with-handling-ability extraction step: S6). In the shop-with-handling-ability extraction step, for example, the shop confirmation unit transmits at least a part of the user information to the shop terminal 3 of the nearby shop and confirms the possibility of the failure handling (a shop confirmation step), so that the handling-ability shop, which can perform the failure handling, is extracted from the nearby shops on the basis of the confirmation result (information on the possibility of the failure handling transmitted from the nearby shops). Alternatively, information (information on tire inventory or the traffic situation of a shop, and the like) required for confirming the possibility of the failure handling is allowed to be transmitted from the shop terminal 3 to the tire management server at a predetermined interval and is allowed to be stored in the shop information database 2B as a part of the shop information (information on the possibility of the failure handling frequently updated), so that the handling-ability shop, which can perform the failure handling, may be extracted from the nearby shops on the basis of the information.

These steps S5 and S6 are specifically performed as follows. That is, firstly, as the aforementioned nearby shop, a nearby shop nearest the position information (the failure occurrence place) is extracted. Then, the possibility of the failure handling is determined for the extracted nearby shop as described above. When the determination result is "possible", the nearby shop is extracted as the handling-ability shop. On the other hand, when the determination result is "impossible", a nearby shop, which is near the position information (the failure occurrence place) next to the nearby shop with the determination result "impossible", is extracted as the aforementioned nearby shop, and similar determination is performed. The extraction and the determination are repeated until the result of the determination for the possibility of the failure handling is "possible" (that is, until the handling-ability shop is extracted). Additionally, these steps S5 and S6 can be configured to be repeated until the number of handling-ability shops extracted is a number set in advance, so that a plurality of handling-ability shops can also be extracted.

Shop information on the handling-ability shop extracted as above is transmitted to the user terminal 4 by the shop information transmission unit (S7). In this way, it is possible to provide the failure handling at the time of the occurrence of the failure, so that a user can acquire information on a shop positioned nearest the failure occurrence place and receive the failure handling reliably and quickly. As described above, when the shop confirmation unit transmits the at least a part of the user information to the shop terminal 3 of the nearby shop and confirms the possibility of the failure handling, since the at least a part of the user information is transmitted to the handling-ability shop at this time point, the preparation of the failure handling can be performed in the shop until a user reaches. This is advantageous in that quick failure handling can be provided.

As described above, in the tire operation service system of the present technology, at the time point at which the abnormality of a tire is detected by the tire information monitoring device 1, since tire abnormality information is directly transmitted from the tire information monitoring device 1 to the tire operation server 2, it is possible to find the tire abnormality (the failure of the tire) in the early stages. Additionally, when handing the tire abnormality (the failure of the tire), nearby shops, which handle the tire mounted on a vehicle of a user and exist near the failure occurrence place, can be specified by the nearby shop extraction unit (in the nearby shop extraction step) on the basis of the position information transmitted from the tire information monitoring device 1 and the user information extracted by the user information extraction unit. In this case, since the nearby shops are not only simply specified, but also a handling-ability shop, which can perform failure handling at the time of the occurrence of the failure, can be specified by the shop-with-handling-ability extraction unit (in the shop-with-handling-ability extraction step) among the nearby shops, it is possible to present the user with a shop which exists around the tire abnormality occurrence place and can reliably perform failure handling. In this case, since the function of detecting the position information is incorporated in the tire information monitoring device 1, it is not necessary to separately provide a device for detecting the position information, and since the user information is correlated with the unique identifying information given to the tire information monitoring device 1, it is possible to quickly extract the user information by simply receiving various types of information from the tire information monitoring device 1.

Figure 3:
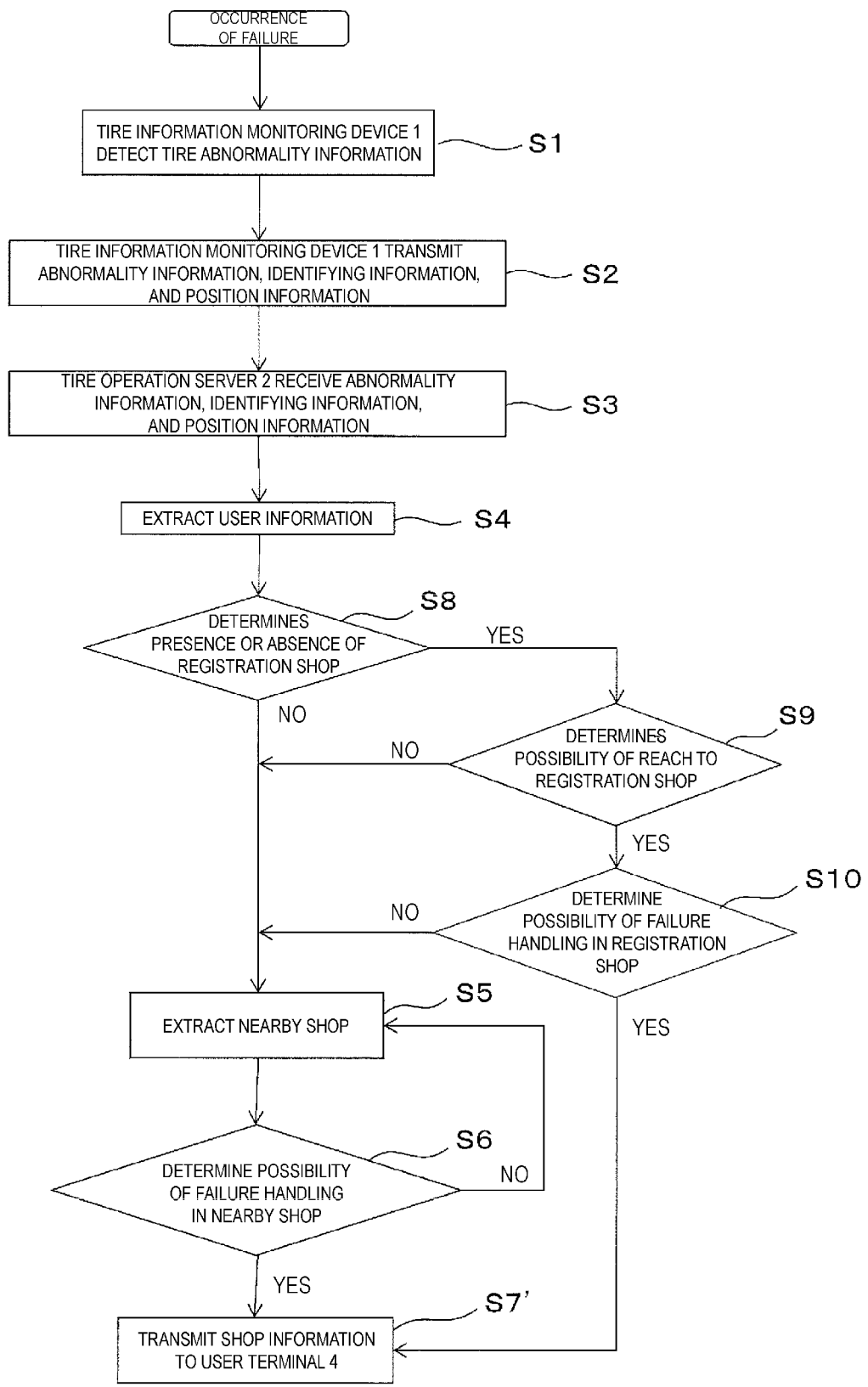
FIG. 3 is a chart for explaining the flow of a tire operation service method according to another embodiment of the present technology.

As described above, the shop information on the registration shop registered in advance by a user can be stored in the user information database 2A; however, in such a case, it is preferable to provide the tire operation server 2 with a determination unit, which determines the possibility of reaching the registration shop on the basis of the tire abnormality information and the position information transmitted from the tire information monitoring device 1, and a registration shop confirmation unit which transmits at least a part of the user information to the shop terminal 3 of the registration shop and confirms the possibility of the failure handling. In this case, as illustrated in FIG. 3, when the tire operation server 2 receives the abnormality information and the like (S3), the presence or absence of the registration shop is determined (S8) and the determination unit determines the possibility of reaching the registration shop when there is the registration shop (a determination step: S9). As a consequence, when it is determined that reaching the registration shop is possible, the registration shop confirmation unit determines the possibility of the failure handling in the registration shop (a registration shop confirmation step: S10). In this way, when it is confirmed that the failure handling in the registration shop is possible, the shop information on the registration shop is transmitted to the user terminal 4 (S7'). In this case, when it is determined in the determination step that reaching the registration shop is not possible or it is confirmed in the registration shop confirmation step that the failure handling in the registration shop is not possible, the nearby shops are extracted (S5) and the possibility of the failure handling in the extracted nearby shops is determined (S6) as described above. Although the steps regarding the registration shop are added as described above, the other steps, other than the aforementioned steps regarding the registration shop, are performed similarly to the flow illustrated in FIG. 2. In this way, it is possible to determine the possibility of the failure handling in the registration shop registered in advance by a user, and when the failure handling in the registration shop is possible, it is possible to preferentially present the registration shop.

The invention claimed is:

1. A tire operation service system comprising:
   a tire information monitoring device installed in a vehicle to monitor information on a tire mounted on the vehicle and a detect position information, including unique identifying information;
   a tire operation server including a user information database stored with user information corresponding to the identifying information and a shop information database stored with position information on each shop and connected to the tire information monitoring device via a communication network; and
   a shop terminal and a user terminal connected to the tire operation server via a communication network,
   wherein
   the tire operation server comprises:
   a user information extraction unit that, on a basis of identifying information transmitted from the tire information monitoring device together with tire abnormality information, extracts user information corresponding to the identifying information from the user information database;
   a nearby shop extraction unit that, on a basis of position information transmitted from the tire information monitoring device together with the tire abnormality information and the user information extracted by the user information extraction unit, extracts nearby shops matching the position information and the user information from the shop information database;
   a shop-with-handling-ability extraction unit that extracts a handling-ability shop, in which failure handling is possible, from the nearby shops on a basis of information on possibility of failure handling transmitted from a shop terminal of the nearby shops; and
   a shop information transmission unit that transmits shop information on the handling-ability shop to the user terminal.

2. The tire operation service system according to claim 1, wherein
   the tire operation server includes a shop confirmation unit that transmits at least a part of the user information extracted by the user information extraction unit to the shop terminal of the nearby shops extracted by the nearby shop extraction unit and confirms possibility of failure handling, and
   the shop-with-handling-ability extraction unit includes a function of extracting the handling-ability shop, in which failure handling is possible, from the nearby shops on the basis of the information on possibility of failure handling, which is transmitted from the shop terminal of the nearby shops, according to the at least a part of the user information transmitted by the shop confirmation unit.

3. The tire operation service system according to claim 2, wherein the user terminal includes a display unit that displays shop information on a plurality of handling-ability shops, which is transmitted by the shop information transmission unit, as a selection linked with a contact unit for each handling-ability shop.

4. The tire operation service system according to claim 3, wherein
   shop information on a registration shop registered in advance by a user is stored in the user information database,
   the tire operation server includes a determination unit which determines possibility of reaching the registration shop on a basis of tire abnormality information and position information transmitted from the tire information monitoring device and a registration shop confirmation unit which transmits at least a part of the user information to a shop terminal of the registration shop and confirms possibility of failure handling, and
   the shop information transmission unit includes a function of transmitting the shop information on the registration shop to the user terminal when the determination unit determines that reaching the registration shop is possible and the registration shop confirmation unit confirms that failure handling in the registration shop is possible, and a function of transmitting the shop information on the handling-ability shop to the user terminal when the determination unit determines that reaching the registration shop is not possible or the registration shop confirmation unit confirms that failure handling in the registration shop is not possible.

5. The tire operation service system according to claim 1, wherein the user terminal includes a display unit that displays shop information on a plurality of handling-ability shops, which is transmitted by the shop information transmission unit, as a selection linked with a contact unit for each handling-ability shop.

6. The tire operation service system according to claim 1, wherein
   shop information on a registration shop registered in advance by a user is stored in the user information database,
   the tire operation server includes a determination unit which determines possibility of reaching the registration shop on a basis of tire abnormality information and position information transmitted from the tire information monitoring device and a registration shop confirmation unit which transmits at least a part of the user information to a shop terminal of the registration shop and confirms possibility of failure handling, and
   the shop information transmission unit includes a function of transmitting the shop information on the registration shop to the user terminal when the determination unit determines that reaching the registration shop is possible and the registration shop confirmation unit confirms that failure handling in the registration shop is possible, and a function of transmitting the shop information on the handling-ability shop to the user terminal when the determination unit determines that reaching the registration shop is not possible or the registration shop confirmation unit confirms that failure handling in the registration shop is not possible.

7. A tire operation service method using a tire information monitoring device installed in a vehicle, including a function of monitoring information on a tire mounted on the vehicle and a function of detecting position information, and including unique identifying information, a tire operation server including a user information database stored with user information corresponding to the identifying information and a shop information database stored with position information on each shop and connected to the tire information monitoring device via a communication network, and a shop terminal and a user terminal connected to the tire operation server via a communication network; the method comprising:

the tire operation server performing:
a user information extraction step of, on a basis of identifying information transmitted from the tire information monitoring device together with tire abnormality information, extracting user information corresponding to the identifying information from the user information database;
a nearby shop extraction step of, on a basis of position information transmitted from the tire information monitoring device together with the tire abnormality information and the user information extracted by the user information extraction unit, extracting nearby shops matching the position information and the user information from the shop information database;
a shop-with-handling-ability extraction step of extracting a handling-ability shop, in which failure handling is possible, from the nearby shops on a basis of information on possibility of failure handling transmitted from a shop terminal of the nearby shops; and
a shop information transmission step of transmitting shop information on the handling-ability shop to the user terminal.

8. The tire operation service method according to claim 7, wherein
the tire operation server performs a shop confirmation step of transmitting at least a part of the user information extracted by the user information extraction unit to the shop terminal of the nearby shops extracted by the nearby shop extraction unit and confirming possibility of failure handling, and
the shop-with-handling-ability extraction unit extracts the handling-ability shop, in which failure handling is possible, from the nearby shops on the basis of the information on possibility of failure handling, which is transmitted from the shop terminal of the nearby shops, according to at least a part of the user information transmitted by the shop confirmation unit.

9. The tire operation service method according to claim 8, wherein the user terminal displays shop information on a plurality of handling-ability shops, which is transmitted by the shop information transmission unit, as a selection linked with a contact unit for each handling-ability shop.

10. The tire operation service method according to claim 9, wherein
shop information on a registration shop registered in advance by a user is stored in the user information database, and
the tire operation server performs:
a determination step of determining possibility of reaching the registration shop on a basis of tire abnormality information and position information transmitted from the tire information monitoring device, and
a registration shop confirmation step of transmitting at least a part of the user information to a shop terminal of the registration shop and confirming possibility of failure handling, and
the shop information transmission unit transmits the shop information on the registration shop to the user terminal when the determination step determines that reaching the registration shop is possible and the registration shop confirmation step confirms that failure handling in the registration shop is possible, and transmits the shop information on the handling-ability shop to the user terminal when the determination step determines that reaching the registration shop is not possible or the registration shop confirmation step confirms that failure handling in the registration shop is not possible.

11. The tire operation service method according to claim 7, wherein the user terminal displays shop information on a plurality of handling-ability shops, which is transmitted by the shop information transmission unit, as a selection linked with a contact unit for each handling-ability shop.

12. The tire operation service method according to claim 7, wherein
shop information on a registration shop registered in advance by a user is stored in the user information database, and
the tire operation server performs:
a determination step of determining possibility of reaching the registration shop on a basis of tire abnormality information and position information transmitted from the tire information monitoring device, and
a registration shop confirmation step of transmitting at least a part of the user information to a shop terminal of the registration shop and confirming possibility of failure handling, and
the shop information transmission unit transmits the shop information on the registration shop to the user terminal when the determination step determines that reaching the registration shop is possible and the registration shop confirmation step confirms that failure handling in the registration shop is possible, and transmits the shop information on the handling-ability shop to the user terminal when the determination step determines that reaching the registration shop is not possible or the registration shop confirmation step confirms that failure handling in the registration shop is not possible.

\* \* \* \* \*